Aug. 27, 1963
H. R. BURROUGH
3,101,529
METHOD OF REPAIRING A VALVE STEM OR
TUBE WITH AN ADAPTER COUPLING
Filed April 21, 1961
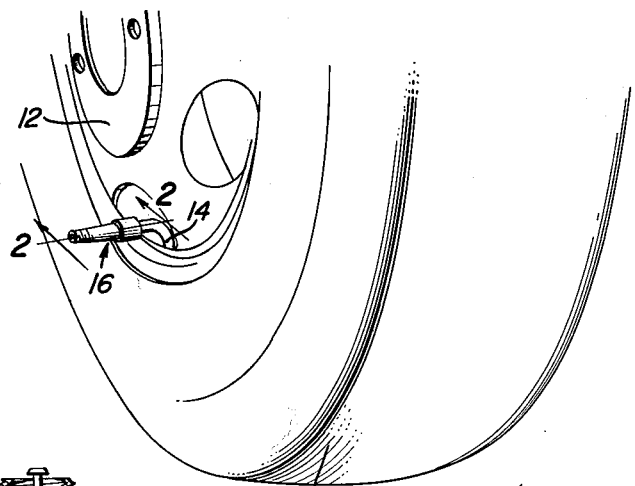
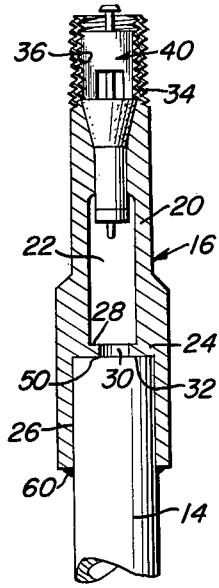
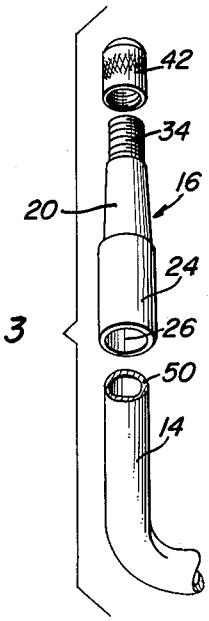
Herbert R. Burrough
INVENTOR.
BY *Clarence A. O'Brien*
*and Harvey B. Jacobson*
Attorneys

United States Patent Office 3,101,529
Patented Aug. 27, 1963

3,101,529
METHOD OF REPAIRING A VALVE STEM OR TUBE WITH AN ADAPTER COUPLING
Herbert R. Burrough, 601 W. Main, Antlers, Okla.
Filed Apr. 21, 1961, Ser. No. 104,686
2 Claims. (Cl. 29—401)

This invention comprises a novel and useful adapter coupling or extension for valve stems and tubing and more particularly relates to a device adapted to be permanently applied to the outer extremity of a valve stem.

It frequently develops that the valve stems of automobile tires for various reasons are not of sufficient length to be conveniently accessible for supplying of air or testing the air pressure of a tire. When this condition occurs the end of the valve stem frequently becomes inaccessible occasioning a great deal of trouble to persons attempting to service the vehicle tires.

Moreover, in other instances frequently wear develops or damage otherwise occurs to the extremity of a conventional valve stem which greatly impairs or even completely destroys the efficiency of the valve stem rendering it difficult to retain the air pressure within the tire, or to test the tire air pressure or to apply additional air thereto.

In still further other instances, it is often desirable to attach or apply a valved fitting to a tubular conduit for the purpose of admitting fluid pressure thereto and retaining such fluid pressure therein as for various testing purposes and the like.

It is therefore the primary purpose of this invention to provide a novel method of expeditiously repairing damaged valve stems or tubes by use of an adapter coupling which will supply all of the foregoing needs and which may be quickly and easily applied to a valve stem or other tube.

A further object of the invention, to facilitate carrying out the aforementioned method, is to provide an adapter coupling which is ideally adapted to function as an extension of an existing valve stem and in this extension to provide a non-return valve assembly to perform exactly the same functions, but in a more accessible location, of the original valve stem valve assembly.

A further object of the invention is to provide, in a method of the aforementioned character, an adapter coupling which may be readily and permanently secured to damaged valve stems either for the purpose of constituting an extension thereof or in order to provide a replacement for the worn and damaged extremity of or valve of a valve stem.

And a final important object of the invention to be specifically enumerated herein resides in the provision of a valve adapter coupling in accordance with the foregoing objects which may be readily applied to the ends of tubes or the like for the purpose of providing a non-return valve means therefor for various purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view showing a portion of a vehicle wheel with a tire mounted thereon and showing one form of valve stem to which the adapter coupling of this invention has been applied;

FIGURE 2 is a horizontal sectional view taken substantially upon the plane indicated by the section line 2—2 of FIGURE 1 but upon an enlarged scale and showing the manner in which the adapter of this invention is applied to a valve stem; and FIGURE 3 is a group perspective view showing a portion of a valve stem or tube, the adapter coupling of this invention and a closure cap therefor.

In the accompanying drawings, the numeral 10 designates generally a portion of a conventional pneumatic tire, mounted upon a vehicle wheel at 12 and which tire is provided with any conventional form of valve stem as at 14. Indicated generally by the numeral 16 is the adapter coupling of this invention which as shown is applied to the valve stem 14.

Referring now particularly to FIGURES 2 and 3 it will be seen that the adapter coupling 16 consists of an adapter tube 20 of any suitable size, shape and material but preferably of metallic construction and which has a passage 22 extending axially therethrough. At its inner end, the tube 20 is diametrically enlarged as at 24 while the passage is likewise provided with a diametrically enlarged portion as at 26. The junction of this diametrically enlarged portion 26 with the main portion of the passage 22 is effected by means of an internal flange or rib 28 having an aperture 30 therethrough. This flange provides an annular seat or shoulder 32 for a purpose to be subsequently apparent.

At its outer end, the tube 20 is provided with an external threaded portion 34 while the passage therein is likewise provided with an internally threaded bore 36. Removably received within this threaded bore is a core or non-return valve assembly indicated generally by the numeral 40. This core or valve assembly is preferably identical with the conventional tire valve stem assembly with which the original valve stem 14 is normally equipped and may be transferred therefrom.

Preferably, although not necessarily, it is preferred to contour and to proportion the size and dimensions of the adapter 16 so that the same may exactly conform with that of the valve stem 14 so that when applied to the valve stem the outer end of the coupling will be enabled to perform all the functions of the valve stem, as for example by receiving the valve stem closure cap 42 or the like.

Referring now to FIGURES 2 and 3 it will be understood that the conventional valve stem 14 is provided with an externally threaded external portion similar to the extremity 34 upon which the cap 42 was normally received, and with an internally threaded bore similar to that at 36 in which the valve assembly 40 was likewise detachably secured.

When it is desired either to extend the extremity of the valve stem 14 in order to obtain better access to the same, or to repair a damaged valve stem extremity or valve assembly therein, the adapter 16 of the present invention is permanently applied. For this purpose, the threaded and damaged end of the valve stem is cut off as at 50 and the unthreaded enlarged bore 26 of the enlarged portion 24 of the tube 20 is placed over the cut off extremity of the valve stem with the severed end 50 of the valve stem abutting against the annular shoulder 32 of the annular rib 28 as shown in FIGURE 2. In this position, the adapter coupling is permanently united to the valve stem as by welding, soldering or the like as indicated at 60, in FIGURE 2.

In a similar manner, when it is desired to apply a valved extremity to any form of tube, the latter may be introduced through the bore 26, abutted against the annular shoulder 32 and soldered or welded into place as suggested at 60.

It will be observed that the present invention thus provides an adapter coupling which constitutes an attachment for either various shapes and types of valve stems of automotive tires and the like, or for tubes in general, to either provide a valved extension therefor or a replacement extremity therefor as desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A method of repairing a tire valve including a tubular stem having a damaged threaded free end portion, a core mounted therein and a cap mounted thereon, said method comprising removing the core and the cap from the stem, then severing the damaged threaded end portion of the stem at a location spaced from said damaged threaded end portion, then mounting an adapter tube having an internal annular rib in its lower end portion, on the stem by telescoping said lower end portion of said adapter tube over the severed end of the stem until said annular rib is in abutment with said severed end, thereby stopping the telescoping operation, then inserting the core in the adapter tube, and then mounting the cap on said adapter tube.

2. A method in accordance with claim 1, said method comprising the additional step of fixedly securing the adapter coupling to the stem.

References Cited in the file of this patent
UNITED STATES PATENTS

| | | |
|---|---|---|
| 169,645 | Lawless | Nov. 8, 1875 |
| 1,430,527 | Allen | Oct. 3, 1922 |
| 2,275,820 | Hosking | Mar. 10, 1942 |
| 2,355,871 | Kraft | Aug. 15, 1944 |
| 2,508,503 | Doepke | May 23, 1950 |
| 2,813,567 | Williams | Nov. 19, 1957 |